United States Patent
Schulz

(10) Patent No.: US 11,788,605 B2
(45) Date of Patent: Oct. 17, 2023

(54) MODULAR HIGH PRECISION GEAR BOX ARRANGEMENT

(71) Applicant: AKTIEBOLAGET SKF, Gothenburg (SE)

(72) Inventor: Ingo Schulz, Gerolzhofen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/795,591

(22) PCT Filed: Jan. 29, 2021

(86) PCT No.: PCT/EP2021/052180
§ 371 (c)(1),
(2) Date: Jul. 27, 2022

(87) PCT Pub. No.: WO2021/156155
PCT Pub. Date: Aug. 12, 2021

(65) Prior Publication Data
US 2023/0096956 A1    Mar. 30, 2023

(30) Foreign Application Priority Data
Feb. 4, 2020   (DE) .......................... 102020201340.3

(51) Int. Cl.
*F16H 57/033*    (2012.01)
*F16H 1/28*    (2006.01)
*F16H 57/023*    (2012.01)

(52) U.S. Cl.
CPC .......... *F16H 1/2863* (2013.01); *F16H 57/023* (2013.01); *F16H 2001/2872* (2013.01); *F16H 2057/0335* (2013.01)

(58) Field of Classification Search
CPC ................. F16H 1/2863; F16H 57/023; F16H 2001/2872; F16H 2057/0335
See application file for complete search history.

(56) References Cited

U.S. PATENT DOCUMENTS

| 4,043,226 A | 8/1977 | Buuck |
|---|---|---|
| 9,127,752 B2 | 9/2015 | Kullin |

(Continued)

FOREIGN PATENT DOCUMENTS

| CA | 2903400 A1 | 3/2016 | |
|---|---|---|---|
| CN | 107448553 A * | 12/2017 | ............. B25J 9/102 |

(Continued)

OTHER PUBLICATIONS

International Search Report and Written Opinion dispatched Aug. 12, 2021 for parent application No. PCT/EP2021/052180.

*Primary Examiner* — Justin Holmes
(74) *Attorney, Agent, or Firm* — J-TEK LAW PLLC; Scott T. Wakeman; Mark A. Ussai

(57) ABSTRACT

A modular high precision gear box arrangement includes first and second gear boxes. The first gear box has a first rotatable hollow wheel, a second fixed hollow wheel and at least one double planet having a first planet and a second planet arranged on a planet shaft. The first planet meshes with the first hollow wheel, the second planet meshes with the second hollow wheel, and the first hollow wheel is coupled with an output. The second gear box includes a fixed hollow wheel that is the second hollow wheel of the first gear box and at least one planet that is the second planet of the at least one double planet of the first gear box. The second gear box further includes an input for driving the planet shaft, wherein the input is arranged centrically or eccentrically to a central rotation axis of the gear box arrangement.

13 Claims, 3 Drawing Sheets

(56) References Cited

U.S. PATENT DOCUMENTS

| | | |
|---|---|---|
| 2014/0171251 A1 | 6/2014 | Kullin |
| 2015/0283924 A1 | 10/2015 | Boutouil et al. |
| 2017/0198785 A1 | 7/2017 | Kluender |
| 2018/0135694 A1 | 5/2018 | Stephan |
| 2018/0231113 A1 | 8/2018 | Schulz et al. |
| 2019/0203806 A1 | 7/2019 | Schulz et al. |
| 2019/0383360 A1 | 12/2019 | Schulz |
| 2022/0082154 A1 | 3/2022 | Schulz |

FOREIGN PATENT DOCUMENTS

| | | | | |
|---|---|---|---|---|
| CN | 108730435 A | * | 11/2018 | .............. F16H 3/70 |
| CN | 110686049 A | * | 1/2020 | |
| DE | 102012217102 A1 | | 5/2014 | |
| DE | 102019200933 A1 | | 7/2020 | |
| EP | 0188233 B1 | | 9/1990 | |
| EP | 0222018 B1 | | 5/1992 | |
| EP | 2693079 A2 | | 2/2014 | |
| EP | 3101313 A1 | | 12/2016 | |
| FR | 2580760 A1 | * | 10/1986 | |
| JP | 2003278849 A | * | 10/2003 | .............. F16H 1/28 |
| WO | 2006066985 A1 | | 6/2006 | |
| WO | 2015185036 A1 | | 12/2015 | |
| WO | 2017046767 A1 | | 3/2017 | |
| WO | WO-2020007317 A1 | * | 1/2020 | ............. B60K 17/08 |

\* cited by examiner

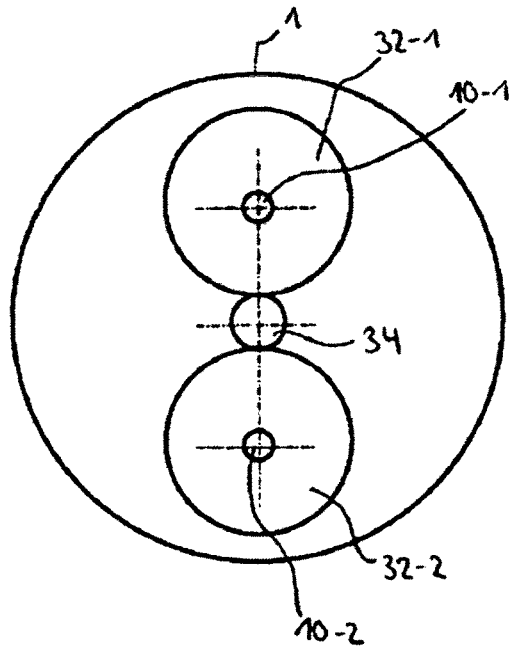
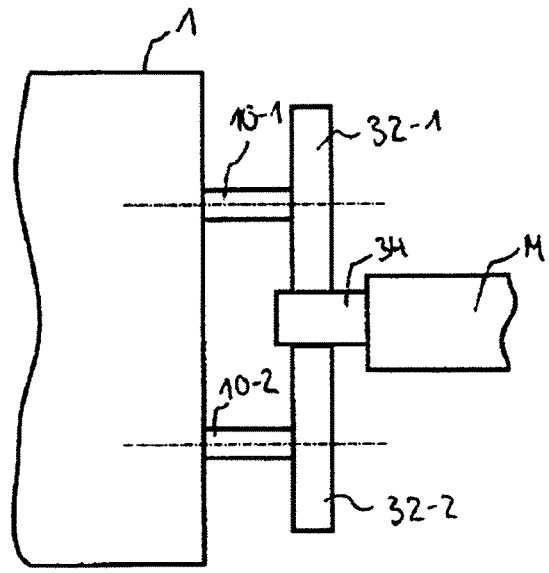
Fig. 3a   Fig. 3b
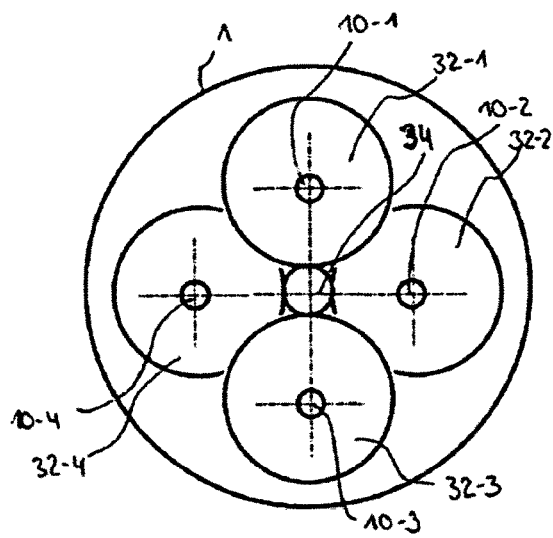
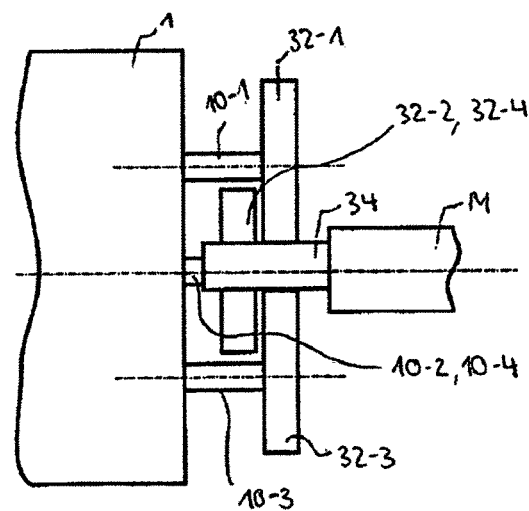
Fig. 4a   Fig. 4b

MODULAR HIGH PRECISION GEAR BOX ARRANGEMENT

CROSS-REFERENCE

This application is the U.S. National Stage of International Application No. PCT/EP2021/052180 filed on Jan. 29, 2021, which claims priority to German patent application no. 10 2020 201 340.3 filed on Feb. 4, 2020.

TECHNOLOGICAL FIELD

The present disclosure is directed to a modular high precision gear box arrangement that can be driven centrically or eccentrically.

BACKGROUND

High precision gear boxes mainly have a coaxially positioned motor so that the gear box is driven by a centrically positioned pinion or sun wheel. If an eccentrically positioned motor is requested, e.g. because the gear box shall have a hollow shaft so that cables can be guided directly through the gear box, usually the structure of the centrically driven gear box needs to be changed or the input stage needs higher complexity in its technical solution. For gear boxes that usually have an eccentric position of the motor, a requested centric position usually requires a higher complexity of the input stage. Higher complexity in this case may result in more parts, a more complex gear structure than only one spur gear stage, more power loss due to additional gear teeth contacts, bearings and additional, longer and less beneficial power flows.

SUMMARY

It is therefore object of the present invention, to provide a high precision gear box arrangement, allowing to realize a high precision gear box arrangement with both a centric and eccentric input drive.

The modular high precision gear box arrangement comprises at least a first gear box and a second gear box. The first gear box comprises a first rotatable hollow wheel, a second fixed hollow wheel and at least one double planet having a first planet stage with at least one first planet and a second planet stage with at least one second planet, wherein one first planet of the first planet stage and one second planet of the second planet stage are arranged on a planet shaft. The at least one first planet meshes with the first hollow wheel and the at least one second planet meshes with the second hollow wheel. Further, the first hollow wheel is coupled with an output carrier.

The second gear box comprises a fixed hollow wheel being the second hollow wheel of the first gear box and at least one planet being arranged at the second planet stage of the at least one double planet of the first gear box. The at least one planet arranged at the second planet stage may be the second planet of the of the at least one double planet of the first gear box. Alternatively, the second planet stage may comprise two second planets on one planet shaft, one serving as second planet of the double planet of the first gear box and one serving as the at least one planet of the second gear box.

The second gear box further comprises an input for driving the planet shaft, wherein the input is arranged centrically or eccentrically to a central rotation axis of the gear box arrangement.

Due to this arrangement, it is possible to use a second gear box which can be driven centrically or eccentrically in combination with a first gear box which remains for both drives. As a part of the second gear box is at the same time a part of the first gear box, the changes, which are required for a switch between a centrically or eccentrically arranged drive, are small compared to existing solutions. This provides a variably usable gear box arrangement.

In an embodiment where the input or drive is arranged eccentrically, the input may be coupled to an input pinion, wherein the input pinion meshes with an input gear. The input gear is arranged so that it drives a carrier being coupled with the planet shaft, thus driving the planet shaft and thus the output carrier.

In contrast to this, in an embodiment where the input is arranged centrically, the second gear box may comprise a sun and a third planet stage with at least one third planet being arranged on the planet shaft, wherein the sun meshes with the at least one third planet, and wherein the input is arranged centrically and is coupled to the sun.

In this embodiment, for each planet shaft, a third planet stage is realized on the planet shaft which has already two planet stages. The third planets of the third planet stage are meshing with a centrically positioned sun, driven by a centrically positioned motor. The second gear box thus comprises a double planet wherein the first planet stage of this double planet is the second planet stage of the first gear box. The overall arrangement of the high precision gear box arrangement therefore consists of two double planet gear boxes.

In this centric case, it is also possible to fix the carrier and to rotate the second hollow wheel.

According to a further embodiment, the ratio of the first hollow wheel to the first planet is greater than the ratio of the second hollow wheel to the second planet. The ratio may be for example 68/24 for the first hollow wheel to the first planet and 68/26 for the second hollow wheel to the second planet. Such a ratio may improve the efficiency of the gear box arrangement.

The gear box arrangement may comprise one or more planet shafts, in particular two, three or four planet shafts, each having a first planet stage, a second planet stage and a third planet stage. The utilization of more than one planet shaft provides a distribution of the load to more than one shaft and thus provides a longer service life of the shafts.

In case of such a load split, i.e. when more than one planet shaft and therefore more than one planet per planet stage are used, it is possible to drive only one or at least less than the full amount of planet shafts. This may provide some advantages in view of reduced parts and thus reduced complexity, reduced weight and reduced friction. This in turn may increase the efficiency. Further, using more than one planet shaft may provide a chance to use backlash elimination as will be described below.

In a further embodiment where the gear box arrangement comprises at least two third planets in the third planet stage (i.e. at least two planet shafts each having one third planet in the third planet stage), the third planets of this third planet stage may be arranged opposite to each other in the same plane. When the third planets are not interfering, they may be positioned in the same plane. In particular when using more than two third planets, i.e. more than two planet shafts, the third planets may interfere when they are in one plane (e.g. in case of four planet shafts), the two planets positioned on opposite sides can be located in a plane different from the other two planets. Thus, the third planets being arranged adjacent to each other are arranged in different planes.

Another possibility in order to avoid interfering between the third planets is to extend the sun from the input side to the output side. Then, a part of the third planets of the third planet stage may be arranged at the input side and a part of the third planets of the third planet stage may be arranged at the output side. In particular, in the case of four planet shaft, two planets of the third planet stage, that are opposite to each other, can be located on the actual input stage side of the gear box arrangement, and the other two planets that are opposite to each other, can be located on the actual output stage side of the gear box arrangement. Different constellations are also possible, for example all planets may be positioned on the output side.

In order to reduce backlash, the planets may be preloaded. For example, the gearing of the first planet of one planet shaft may be preloaded in a clockwise direction to be in contact with the gearing of the first hollow wheel. Further, the gearing of the second planet of one planet shaft may be preloaded in a counterclockwise direction to be in contact with the gearing of the second hollow wheel.

Additionally or alternatively, the gearings of two oppositely arranged third planets may be preloaded in a clockwise direction to be in contact with the gearing of the sun. Further, the gearings of the other two oppositely arranged third planets may be preloaded in a counterclockwise direction to be in contact with the gearing of the sun.

The modular gear box arrangement provides a combination of one double-planet gear structure (the first gear box), in which each first and second planet is meshing with one hollow gear (for the gear box described herein, this is considered as the Main Gear Module (MGM), that is not changed, regardless whether it is centrically or eccentrically driven) merged with another gear structure (the second gear box), in which one (virtual) planet is meshing with one internal/hollow gear and one third planet is meshing with a pinion/sun gear (for the gear box described herein, this is considered as the Input Gear Module (IGM)). The second gear box is either a double-planet structure (in the case of a centrically driven gear box arrangement) or an open single planet gear box (in the case of an eccentrically driven gear box arrangement).

At the same time, the virtual planet is part of the first gear box and the second gear box as described above. Thus, the second planet of the MGM and the virtual planet of the IGM are the same part. The same is true for the carrier, i.e. the carrier of the MGM is at the same time the carrier of the IGM. The same is true for the planet shaft, i.e. the planet shaft of the MGM is at the same time the planet shaft of the IGM. In another exemplary embodiment, the second planet of the MGM and the virtual planet of the IGM may be realized as two separate planets, which are both part of the same planet stage, i.e. the second planet stage.

This provides the advantage that an eccentric and a centric driven gear box may be realized with the same main gear module, i.e. same reduction ration of MGM, same dimensions, same interfaces.

Further preferred embodiments are defined in the dependent claims as well as in the description and the figures. Thereby, elements described or shown in combination with other elements may be present alone or in combination with other elements without departing from the scope of protection.

In the following, preferred embodiments of the invention are described in relation to the drawings, wherein the drawings are exemplarily only, and are not intended to limit the scope of protection. The scope of protection is defined by the accompanied claims, only.

BRIEF DESCRIPTION OF THE DRAWINGS

The figures show:

FIG. 3: a top view and a sectional partial view of the modular high precision gear box arrangement according to FIG. 2 in a first alternative;

FIG. 4: a top view and a sectional partial view of the modular high precision gear box arrangement according to FIG. 2 in a second alternative.

DETAILED DESCRIPTION

Figure 1:
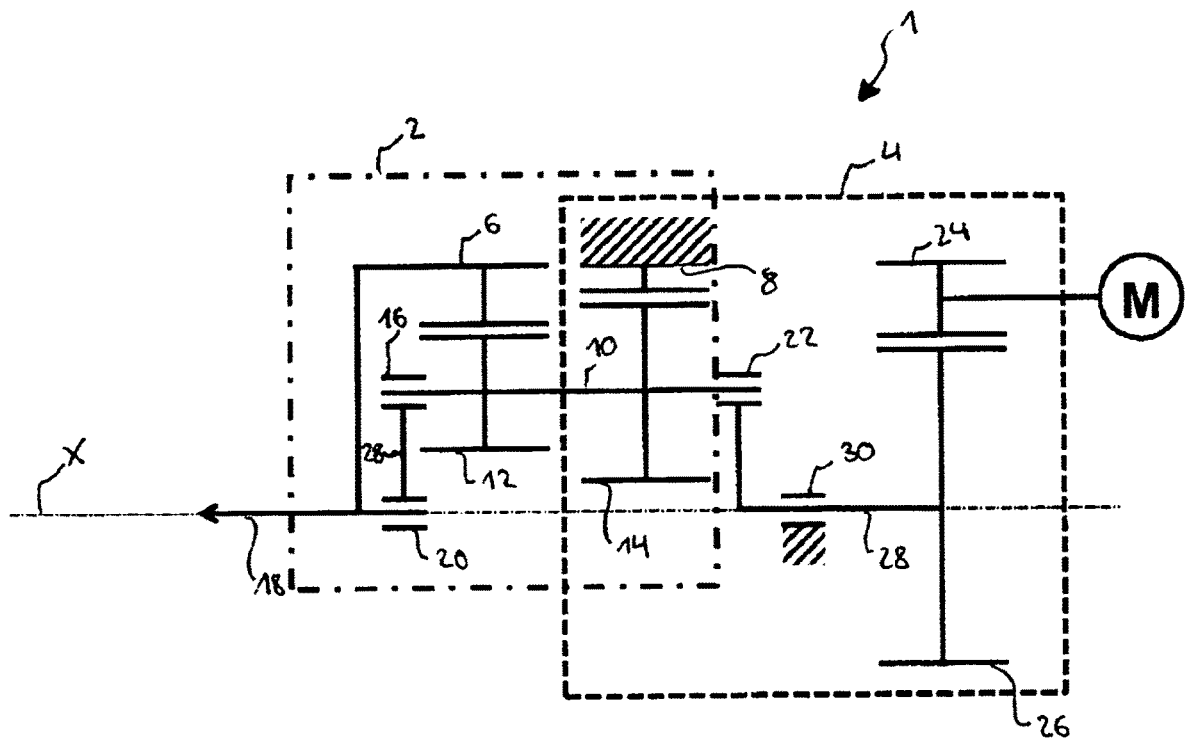
FIG. 1: a schematic view of a modular high precision gear box arrangement according to a first embodiment.

In the following same or similar functioning elements are indicated with the same reference numerals.

FIG. 1 shows a modular high precision gear box arrangement 1 with a first gear box 2 and a second gear box 4. In the case of FIG. 1, the second gear box 4 is an open gear box. The first gear box 2 comprises a first rotatable hollow wheel 6 and a second fixed hollow wheel 8. The first gear box 2 further comprises a planet shaft 10 on which a first planet 12 (representing a first planet stage) and a second planet 14 (representing a second planet stage) are arranged, forming a double planet. The planet shaft 10 is supported by a planet shaft bearing 16, 22. The gearing of the first planet 12 meshes with the gearing of the first hollow wheel 6 and the gearing of the second planet 14 meshes with the gearing of the second hollow wheel 8.

Further, the first hollow wheel 6 is coupled with an output 18. The output 18 is supported via a carrier bearing 20. The output 18 is arranged in a central rotational axis X.

The second gear box 4 comprises a fixed hollow wheel 8, which at the same time is part of the first gear box 2. Further, the second gear box 4 comprises the planet 14 being arranged on the planet shaft 10, the planet 14 and the planet shaft 10 being at the same time part of the first gear box 2.

The planet shaft 10 is supported via the planet shaft bearing 22 at the side of the second gear box 4, being at the same time part of the first gear box 2. In the embodiment as shown in FIG. 1, the gear box arrangement 1 is eccentrically driven via a motor M. In this case, the motor or input M is coupled with an input pinion 24. The input pinion 24 meshes with an input gear 26 which is coupled with an input carrier 28. The input carrier 28, supported via a carrier bearing 30, is in turn coupled with the planet shaft bearing 22.

Figure 2:
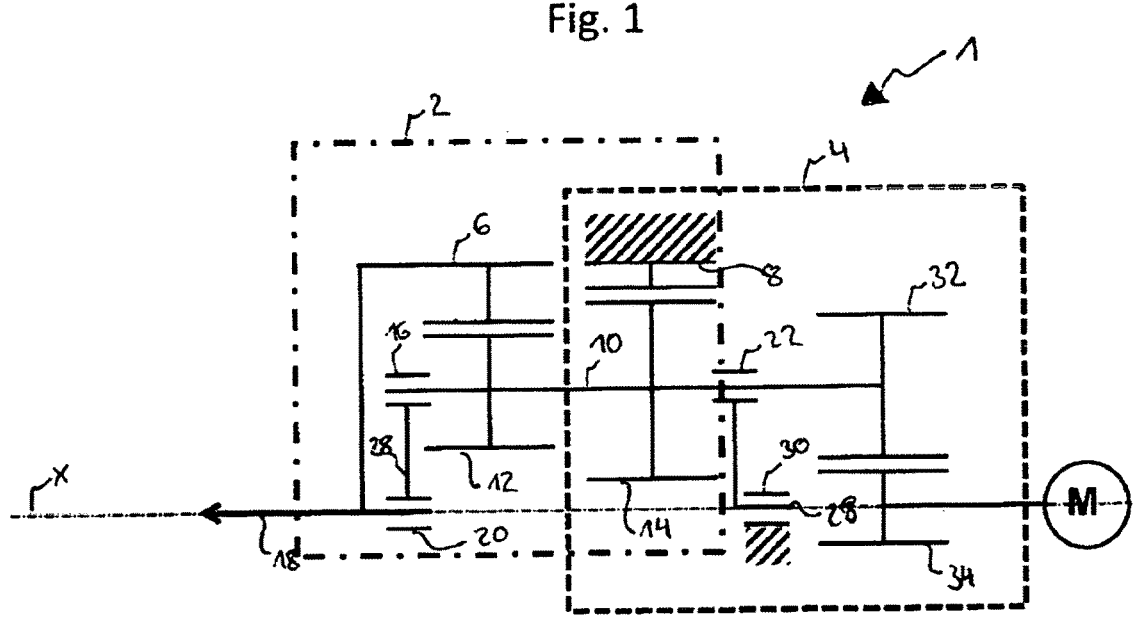
FIG. 2: a schematic view of a modular high precision gear box arrangement according to a second embodiment.

As part of the first and the second gear box 2, 4 are the same elements, this provides a simple way of providing a gear box arrangement 1, which can be used either with the eccentrically arranged input as shown in FIG. 1, as well as an eccentrically arranged input as shown in FIG. 2, which will be described below.

In contrast to the embodiment of FIG. 1 with an input pinion 24 and an input gear 26, the second gear box 4 in the embodiment of FIG. 2 comprises a third planet 32 (representing a third planet stage), which is also arranged on the planet shaft 10. The third planet 32 meshes with a sun 34, which is coupled or driven via the input M.

The sun 34 is centrically arranged on the central rotational axis X together with the input M. In this embodiment, the first gear box 2 as well as the second gear box 4 each comprise a double planet, wherein the second planet 14 (i.e.

the second planet stage) of the first gear box 2 is, at the same time, the first planet 14 of the second gear box 4. As can be seen, the same principle arrangement, in particular the same first gear box 2, can be used with a centrically or eccentrically arranged input M.

Although only one planet shaft 10 with one third planet 32 is shown in FIG. 2, the second gear box 4 may comprise more than one planet shaft 10 and thus more than one third planet 32 in the third planet stage. Thus, the number of planet shafts 10 can be more than one, for example, two, three or four (or even more), some examples of these are shown in the following FIGS. 3 to 5. More than one planet shaft 10 may be used for example for splitting the load between the planet shafts 10, thus increasing the service life of the overall gear box arrangement 1.

FIGS. 3*a* and 3*b* show an example with two planet shafts 10-1, 10-2. As can be seen, the two planet shafts 10-1 and 10-2 are arranged opposite to each other with respect to the sun 34. On each planet shaft 10-1 and 10-2, one third planet 32-1 and 32-2 is arranged in the third planet stage. Although not shown, the planet shafts 10-1, 10-2 also comprises a first planet stage and a second planet stage, wherein each planet shaft 10-1, 10-2 comprises one planet per planet stage. In FIG. 3*b*, showing a sectional view of FIG. 3*a*, it can be seen, that the third planets 32-1 and 32-2 can be arranged in the same plane as they do not interfere.

When four planet shafts 10-1, 10-2, 10-3, 10-4 are used, the corresponding third planets 32-1, 32-2, 32-3, 32-4 of the third planet stage may interfere. As can be seen in FIG. 4*a*, the third planets 32-1, 32-2, 32-3, 32-4 are overlapping. In order to avoid interfering between the third planets 32-1, 32-2, 32-3, 32-4, the third planets 32-1, 32-2, 32-3, 32-4 may thus be arranged in different planes. As shown in FIG. 4*b*, two opposite third planets 32-1 and 32-3 are arranged in the same plane, whereas the other two oppositely arranged planets 32-2 and 32-4 are arranged in different planes with respect to the third planets 32-1 and 32-3. This provides the advantage that the third planets do not interfere as oppositely arranged third planets 32-1, 32-3 are arranged in different planes than the other third planets 32-2, 32-4.

Figure 5A:
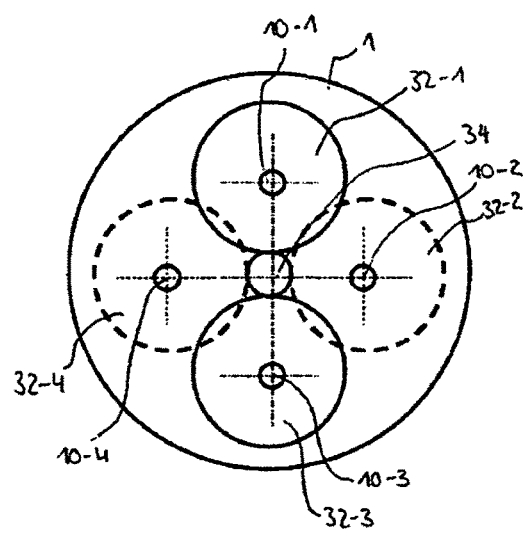
FIG. 5: a top view and a sectional partial view of the modular high precision gear box arrangement according to FIG. 2 in a third alternative.
Figure 5B:
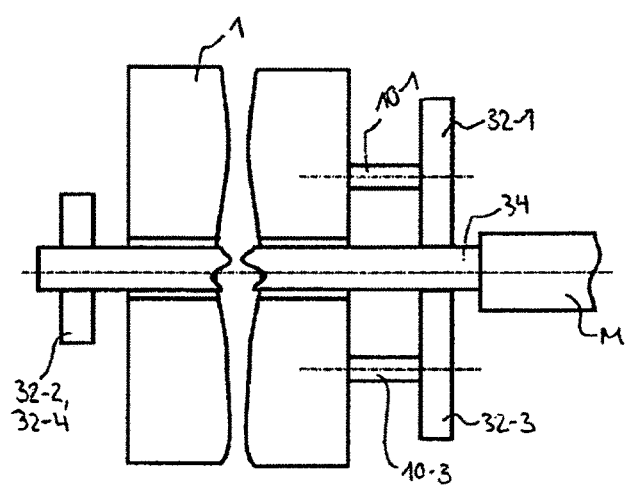

Another possibility may be to arrange two third planets 32-1 and 32-3 at the input stage of the gear box arrangement 1 and the other third planets 32-2 and 32-4 at the output stage of the gear box arrangement 1, as is shown in FIGS. 5*a* and 5*b*. In this case, the sun 34 may extend from the input side, i.e. from the input M, to the output side and the third planet stage is divided in two parts. Also, other arrangements, which are not shown, may be possible.

Due to this gear box arrangement, it is in summary possible to use a second gear box which can be driven centrically or eccentrically in combination with a first gear box which remains the same for both drives. As the first gear box does not need any changes when switching between a centrically or eccentrically arranged drive, the overall changes required on the gear box arrangement are small compared to existing solutions. This provides a variably usable gear box arrangement.

REFERENCE NUMERALS

1 modular high precision gear box arrangement
2 first gear box
4 second gear box
6 first hollow wheel
8 second hollow wheel
10 planet shaft
12 first planet
14 second planet
16 planet shaft bearing
18 output
20 carrier bearing
22 planet shaft bearing
24 input pinion
26 input gear
28 carrier
30 carrier bearing
32 third planet
34 sun
M motor/input
X central rotational axis

The invention claimed is:

1. A modular high precision gear box arrangement comprising at least a first gear box and a second gear box, wherein:
the first gear box comprises a first rotatable hollow wheel, a second fixed hollow wheel and at least one double planet having a first planet stage with at least one first planet and a second planet stage with at least one second planet, wherein one first planet of the first planet stage and one second planet of the second planet stage are arranged on a planet shaft, wherein the at least one first planet of the first planet stage meshes with the first hollow wheel and the at least one second planet of the second planet stage meshes with the second hollow wheel, and wherein the first hollow wheel is coupled with an output; and
the second gear box comprises a fixed hollow wheel being the second hollow wheel of the first gear box and at least one planet being arranged at the second planet stage of the at least one double planet of the first gear box, wherein the at least one planet is the second planet of the at least one double planet of the first gear box, and wherein the second gear box further comprises an input for driving the planet shaft, wherein the input is arranged centrically or eccentrically to a central rotation axis of the gear box arrangement,
wherein:
the second gear box comprises a sun and a third planet stage with at least two third planets, a first one of the at least two third planets being arranged on the planet shaft in a first plane and a second one of the at least two third planets being arranged opposite the first one of the at least two third planets in the first plane, and
the sun meshes with the at least two third planets and the input is arranged centrically and is coupled to the sun.

2. The modular high precision gear box arrangement according to claim 1, wherein a ratio of the first hollow wheel to the first planet is greater than a ratio of the second hollow wheel to the second planet.

3. The modular high precision gear box arrangement according to claim 1, wherein the gear box arrangement comprises two, three or four planet shafts, each having a first planet stage, a second planet stage and a third planet stage.

4. The modular high precision gear box arrangement according to claim 1, wherein a third one of the at least two third planets is arranged adjacent to the first one of the at least two third planets in a second plane spaced from the first plane.

5. The modular high precision gear box arrangement according to claim 1, wherein the sun extends from an input side to an output side and wherein a first portion of the at least two third planets of the third planet stage are arranged at the input side and a second portion of the at least two third planets of the third planet stage is arranged at the output side.

6. The modular high precision gear box arrangement according to claim 1, wherein the at least one first planet and the at least one second planet and the at least two third planets are preloaded for reducing backlash.

7. A modular high precision gear box arrangement comprising at least a first gear box and a second gear box sharing a common axis of rotation, wherein:
   the first gear box comprises a first rotatable hollow wheel, a second fixed hollow wheel and at least one double planet having a first planet stage with at least one first planet and a second planet stage with at least one second planet, wherein one first planet of the first planet stage and one second planet of the second planet stage are arranged on a planet shaft,
   wherein the at least one first planet of the first planet stage meshes with the first hollow wheel and the at least one second planet of the second planet stage meshes with the second hollow wheel,
   wherein the first hollow wheel is coupled with an output,
   wherein the second gear box comprises the second hollow wheel of the first gear box and the one second planet of the at least one double planet of the first gear box and an input for driving the planet shaft,
   wherein the planet shaft is configured to be driven by a first input arrangement at a first time and to be driven by a second input arrangement at a second time,
   wherein the first input arrangement comprises an input arranged eccentrically to the common axis of rotation, an input pinion driven by the input, and an input gear driven by the input pinion, the input gear configured to drive a carrier coupled with the planet shaft, and
   wherein the second input arrangement comprise an input arranged centrically to the common axis of rotation, a sun driven by the input, and a third planet stage with at least one third planet arranged on the planet shaft and meshed with the sun.

8. The modular high precision gear box arrangement according to claim 7, wherein a ratio of the first hollow wheel to the first planet is greater than a ratio of the second hollow wheel to the second planet.

9. The modular high precision gear box arrangement according to claim 7, wherein the gear box arrangement comprises two, three or four planet shafts, each having a first planet stage, a second planet stage and a third planet stage.

10. The modular high precision gear box arrangement according to claim 7, wherein a first one of the at least one third planets is arranged opposite to a second one of the at least one third planets in a same plane.

11. The modular high precision gear box arrangement according to claim 7,
   wherein a first one of the at least one third planets is arranged adjacent to a second one of the at least one third planets, and
   wherein a plane of the first one of the at least one third planet is different than a plane of the second one of the at least one third planet.

12. The modular high precision gear box arrangement according to claim 7, wherein the sun extends from an input side to an output side and wherein a first portion of the at least one third planet is arranged at the input side and a second portion of the at least one third planet is arranged at the output side.

13. The modular high precision gear box arrangement according to claim 7, wherein at least one first planet and the at least one second planet and the at least one third planet are preloaded for reducing backlash.

* * * * *